United States Patent [19]

Martin et al.

[11] Patent Number: 4,724,955
[45] Date of Patent: Feb. 16, 1988

[54] PREPACKED AND DISPOSABLE ANIMAL LITTER RECEPTACLES AND CONTAINMENT THEREFOR

[76] Inventors: James L. Martin, McKinley & Jackson, Stonefort, Ill. 62987; Albert R. Jackson, 707 S. Bentley, Marion, Ill. 62959

[21] Appl. No.: 57,600

[22] Filed: Jun. 3, 1987

Related U.S. Application Data

[63] Continuation-in-part of Ser. No. 864,152, May, 1986, abandoned.

[51] Int. Cl.$^4$ .......................... A01K 1/00; B65D 21/00
[52] U.S. Cl. .......................... 206/204; 119/1; 206/216; 206/499; 220/403; 220/404; 229/171; 229/181
[58] Field of Search .................. 119/1, 17; 206/204, 206/216, 499; 220/403-407; 229/171, 181; 294/1.3-1.5

[56] References Cited

U.S. PATENT DOCUMENTS

| | | | |
|---|---|---|---|
| 2,582,502 | 1/1952 | Nagler | 24/261 |
| 2,783,933 | 3/1957 | Sharts | 229/37 |
| 3,227,137 | 1/1966 | Goldman et al. | 119/1 |
| 3,377,990 | 4/1968 | Mitchell | 119/1 |
| 3,416,995 | 12/1968 | Wilson | 119/1 |
| 3,676,887 | 7/1972 | Klein | 15/104.8 |
| 3,684,155 | 8/1972 | Smith . | |
| 3,886,901 | 6/1975 | Zeitter | 119/1 |
| 4,013,213 | 3/1977 | Giebel . | |
| 4,164,314 | 8/1979 | Edgar . | |
| 4,279,217 | 7/1981 | Behringer | 119/1 |
| 4,312,295 | 1/1982 | Harrington | 119/1 |
| 4,548,160 | 10/1985 | Feitelson | 119/1 |
| 4,553,671 | 11/1985 | Cheesman | 206/611 |
| 4,615,300 | 10/1986 | McDonough | 119/1 |

FOREIGN PATENT DOCUMENTS

81/00504  3/1981  World Int. Prop. O. .

Primary Examiner—Jimmy G. Foster
Attorney, Agent, or Firm—J. Gibson Semmes; J. J. Hayashida

[57] ABSTRACT

A prepacked disposable animal litter and waste container in which plural layers of membranous bags are filled with an absorbent litter, each bag being contained within a substantially rigid fiberboard carton container, wherein bags may be each successively exposed for utility, following usage of an uppermost exposed bag, the bags, together with flaps of the container forming a repository for urine and fecal matter, and becomes a disposal means for the contaminated litter when the user may discard the bags. Flaps of the container extend the container sides vertically and together with the bags create an impermeable membranous cover for the container's interior and exterior in the use mode. Adhesive means secures the flaps, and one overlying bag top is adjusted and placed temporarily as required, in the use mode.

7 Claims, 6 Drawing Figures

PREPACKED AND DISPOSABLE ANIMAL LITTER RECEPTACLES AND CONTAINMENT THEREFOR

CROSS REFERENCES TO RELATED APPLICATIONS

This is a continuation-in-part of pending Ser. No. 864,152, filed May 16, 1986, now abandoned.

BACKGROUND OF THE INVENTION

1. Field of the Invention

Whereas the invention is defined in terms of disposable animal litter utility and containment, the scope of invention is such as to encompass its utility with respect to variable absorbent comminute substances, irrespective of the species of animal defecating and/or urinating therein. Conceivably, the prepacked receptacle unit may be employed in any number of configurations which may be suitably adapted for in-place use at preformed confined spaces such as cages and the like. For purposes of illustration only, the receptacle container is represented in rectangular box-like configuration, as this is generally considered the most convenient three-dimensional form for stacking, storage, transport and the like.

2. Description of the Prior Art

The most cogent developments are set forth in U.S. Pat. Nos.:

Feeley, 3,715,218, Feb. 6, 1973;
Maier, et al., 4,007,285, Feb. 8, 1977;
Bush, 4,069,348, Jan. 17, 1978;
Robinson, 4,318,475, Mar. 9, 1982;
Cornelissens, et al., 4,397,391, Aug. 9, 1983;
Murphy, et al., 4,517,206, May 14, 1985.

The prior art is also represented by other dispensing cartons or plastic containers as referenced by the U.S. Pat. Nos. to E.E. Heck, 3,451,453, dated June 24, 1969 and Christie, 4,363,405, dated Dec. 14, 1982. Related packaging art is represented by Herrington, U.S. Pat. No. 4,512,476, dated Apr. 23, 1985. Within the art, no provision has been made for containment of measured quantities of a litter absorbent substance confined within stacked, disposable bags thus providing multiple, separate layers of absorbent comminute material, comprising a package which when opened, exposes the contents of each successive bag for utility which is readily disposable, immediately and sequentially thereafter. A fiberboard container serves as a temporary housing for the litter bags and contents, precedent to disposal and during utility the combination of fiberboard container and exposed litter bag are coactively engaged to form a substantially rigid, open cavity, the exterior of which is temporarily protected by an impermeable membrane.

SUMMARY OF THE INVENTION

This is a disposable animal litter box which contains multiple layers of contained litter absorbent, wherein two or more successive, partially filled bags are set within a cardboard box in superposed arrangement, so that as one bag may be used in place and subsequently discarded, its removal uncovers a succeeding disposable bag having another measure of the animal litter absorbent within. One of the desirable features of the invention resides in its sanitary utility and convenient hands-off disposability, as required. The containment box is protected against exterior contamination by the interior of each successive receptacle, utility bag as it is opened and secured for use. Clearly, the box which gives form to the partially filled bags, may be used over and over again, but its primary function is as plural bag container and shipping element.

DESCRIPTION OF THE PREFERRED EMBODIMENTS

Figure 1:
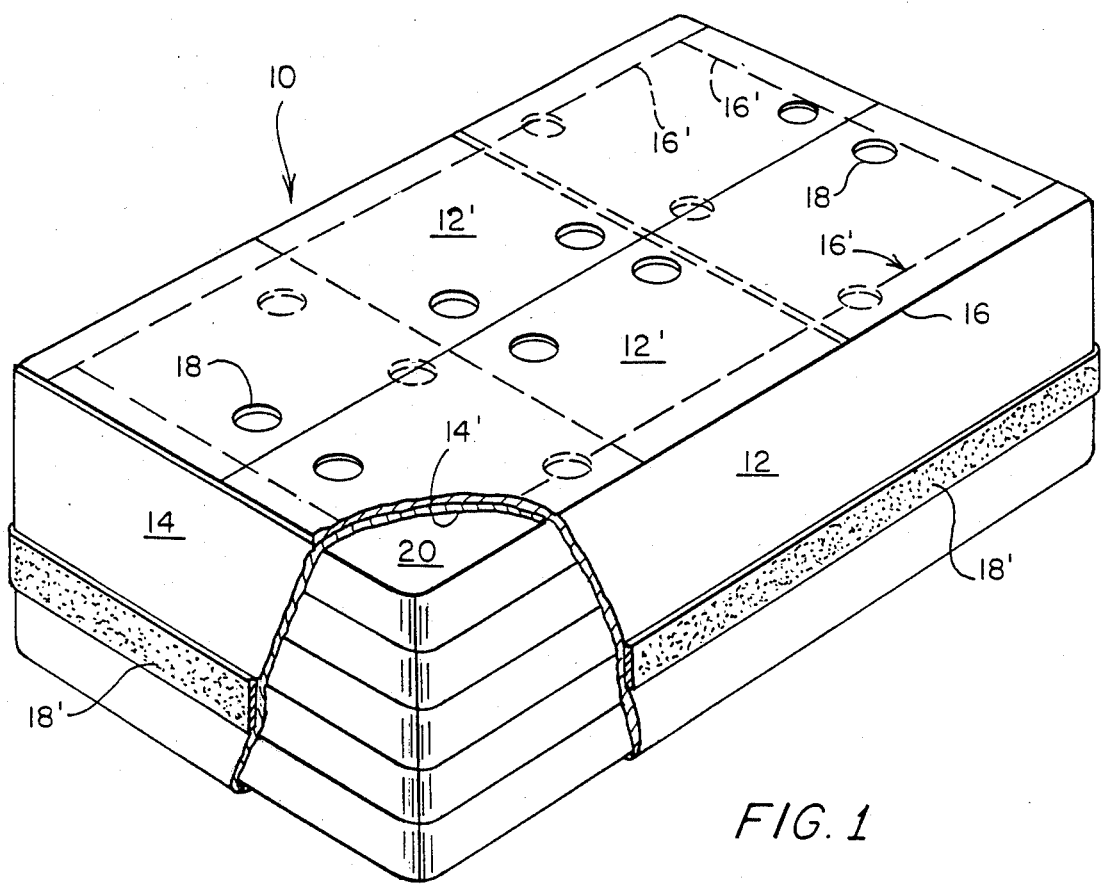
FIG. 1 is a view in perspective of the invention, a portion thereof being broken away, the invention appearing in its storage display and shipping capacity.

Referring to FIG. 1, the disposable rigid carton 10 may be formed in rectangular configuration, having side walls 12 with flaps 12', and end walls 14 with flaps 14'. The flaps 12' and 14' are each provided with longitudinal serrations 16' at the connecting end thereof, thus providing with the 16 upstanding elongations to vertically extend the side and end walls of the box, upon opening thereof in the uility mode, see FIGS. 2 and 4. Note that all flaps 12' and 14' define cut-out apertures 18 adjacent their free ends, thus providing access to the double-sided adhesive strip 18' which extends transversely about the walls of the box. A removable protective tape, not shown, is superposed upon the adhesive during display and/or shipping. Its removal before use of the receptacles is essential. The placement of adhesive behind the cut-out apertures allows the bag top to be pulled down around the box's exterior and adjusted without premature attachment to the exposed adhesive occuring. When the bag is in place one presses on the bag directly over the cut-outs, thus it may be secured, resulting in the placement of a complete protective bag membrane for the exterior of the box.

Figure 3:
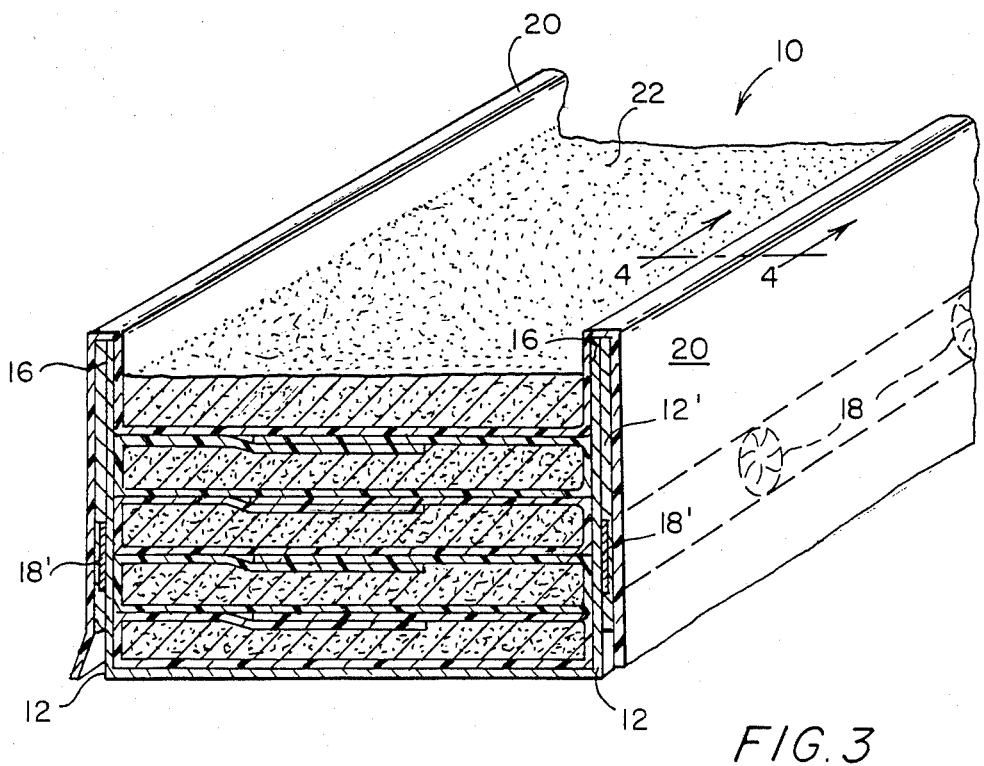
FIG. 3 is a section view in partial perspective, showing the flaps of the FIG. 2 box folded into contiguous sealed relationship with sides of the box, the exposed bag being held in position. The forward portion is a section view taken along lines 3—3 of FIG. 2.
Figure 2:
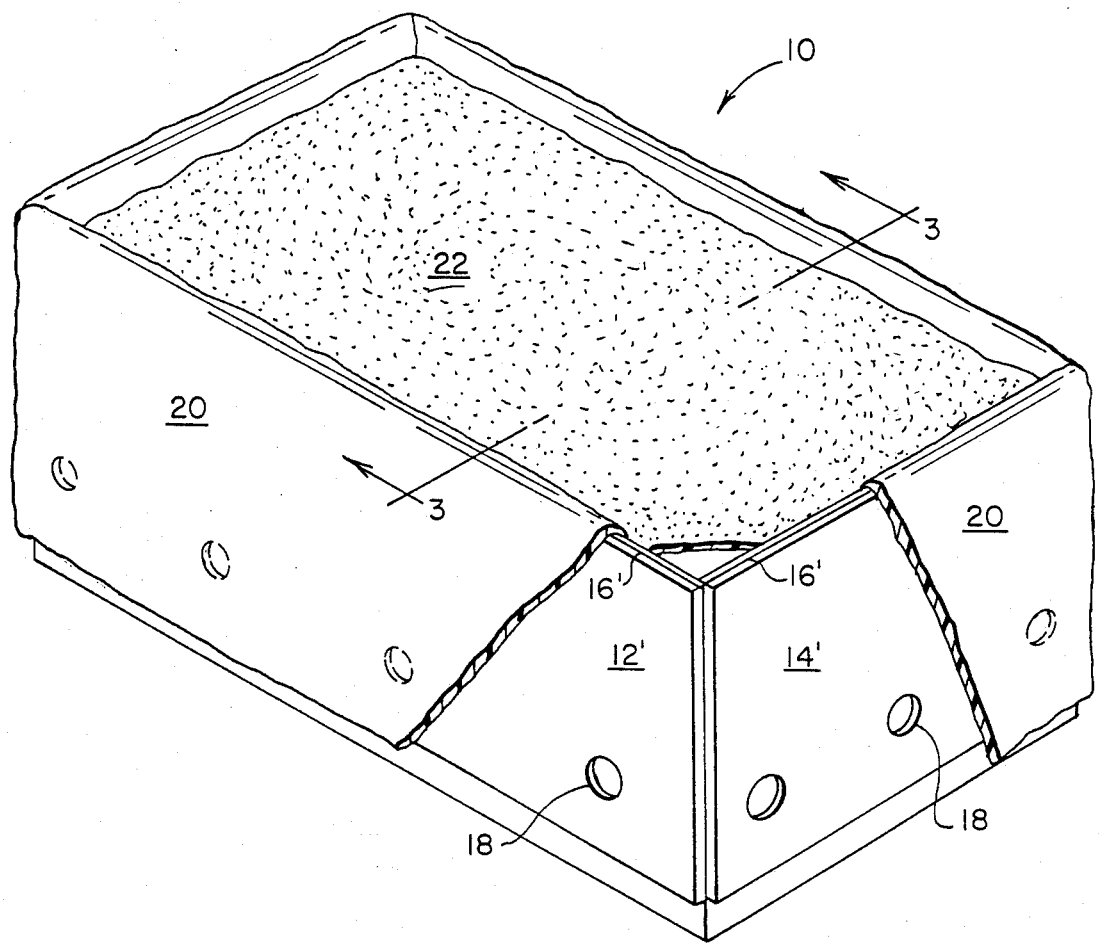
FIG. 2 is a view in perspective of the invention receptacle carton as it is opened for usage, a near corner thereof being broken away to expose the folded open flaps, relative to an exposed receptacle bag.

FIG. 2 illustrates the flaps 12'-14' in their fully opened state and FIG. 3 illustrates the same in fully opened and adhesively set position. FIG. 3, then, depicts the operative or utility mode wherein an exposed topmost litter bag 20 is set so that the free end of the bag is adhesively held downward against the gravity and weight of the closed and partially filled end of the bag, holding the open end of the bag down as a membrane against exposed flap portions 12' and 14' of the containment box. The litter bag top excess depends below the flaps, whereby the holding action of the adhesive and the elastic tendency of the flaps to return to their flat position in packaging is restrained, resulting in a complete protective bag membrane for the exposed flap portions of the carton and the containment carton itself. Removal of the bag and its contaminated contents is easily undertaken by stripping the bag from the adhesive hold, and lifting the exposed bag and its contents from the box.

Figure 4:
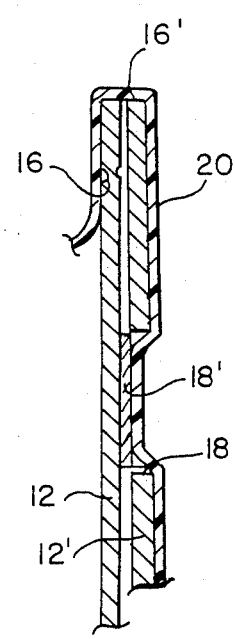
FIG. 4 is an enlarged section view of FIG. 3, taken along lines 4—4 thereof.

FIG. 4 is a section view of the FIG. 3 assembly showing the utility mode, the same being taken along the lines 4—4 of FIG. 3.

In the multi-layered bag arrangement of FIGS. 1 and 3, the respective bags 20 which are not exposed for utility are appropriately folded and closed above the contained litter, beneath the topmost bag until such time as the topmost bag has been used as a receptacle and removed, thus exposing successively each of the other bags for sequential utility, as required. As shown in FIG. 3, the lowermost layers of stacked bags 20, together with the topmost, comprise plural inserts for the bag-dispensing container box 10 itself. A horizontal cross-section of each bag and content, reference FIG. 3, would reveal that its configuration conforms in outline to the horizontal cross- section of the container 10. Thus, bags 20, in this instance are preferably of rectangular cross-section configuration, also in essentially the same size and horizontal cross-section of the container, per se. Thus, as container 10 is of rectangular cross-section horizontally, so then the bag would be of similar horizontal cross-section and of equivalent surface area in cross-section. The depth of litter in each bag is a matter of choice in manufacture and/or market demand. Two or more bags are in disposed superposition, preferably. If the container 10 were of circular, ovular or triangular horizontal cross-section, then the bag size would, perforce be of equivalent horizontal cross- section, with a variable depth characteristic.

These characteristics in configuration will be noted from FIGS. 3 and 4, wherein the free end top of the uppermost, exposed bag 20 is folded over the flaps, whereby the adhesive 18'0 is exposed through the flap apertures 18 to engage and retain the bag top against the respective flaps, the flaps being secured to the carton by the same adhesive 18'. The box is thus substantially encased with a protective outside membrane. Thereafter, the bag is made ready for removal and disposal with its soiled litter waste.

Figure 5:
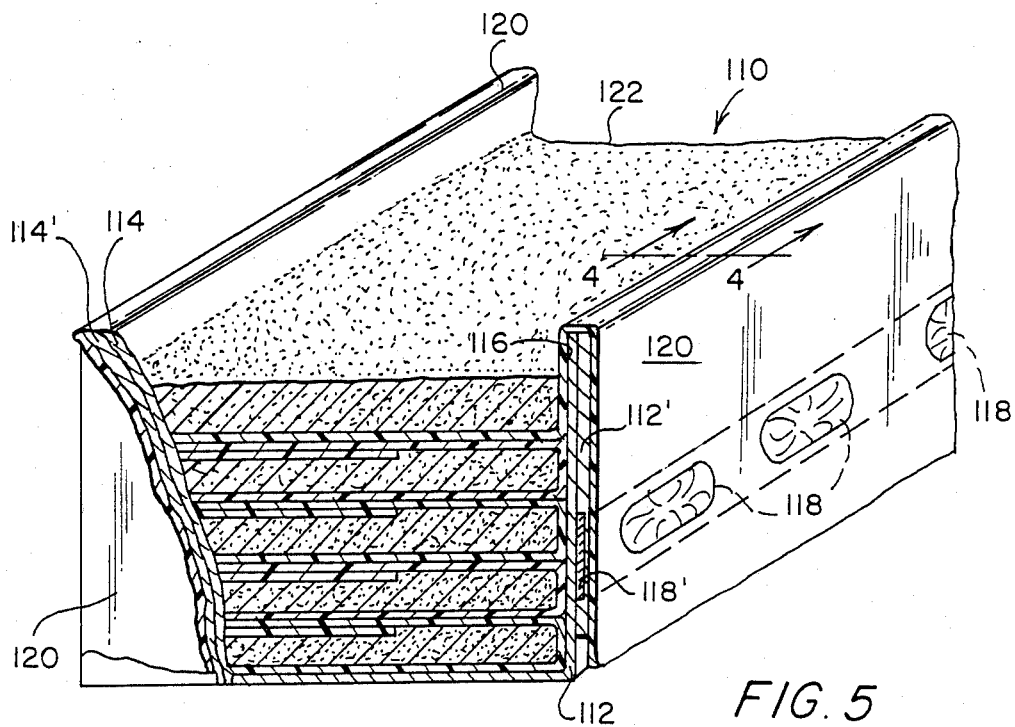
FIG. 5 is a section view in partial perspective, showing an alternate embodiment of the invention depicted in FIG. 3; a near corner thereof in partial section to disclose the relationship of the overlaid bag, the end flap and the end wall.

In FIG. 5 is depicted a further embodiment of invention, specifically with reference to the flap apertures 118. In FIG. 5, the elements are numbered as in FIG. 3 except that the reference numbers are preceded with "1". Thus the free end top of the uppermost, exposed bag 120 is folded over the flaps 112' and 114', whereby the adhesive 118' is exposed through the flap apertures 118 to engage and retain said bag top against the respective flaps. However, the plurality of apertures 118 are horizontally elongated, resulting in a cylindrical configuration (although other elongate configurations are well within the scope of this invention, e.g., rectangular apertures). These elongated access apertures are especially advantageous to the consumer. In common practice, the consumer will locate the carton in an area convenient to the animal, e.g., on the floor or ground. In so doing, the apertures 118 are below the sight level and the user must bend over or stoop to draw the bag 120 over the flaps in the use mode. Thus, in drawing the bag top 120 onto the flaps 112' and 114', the consumer occasionally may experience difficulty in locating the apertures to press and adhere the bag against the pressure-sensitive adhesive 118'. The elongate apertures 118 offer an increased surface area with which to contact the bag top 120 against the adhesive 118'. Especially advantageous though, is the fact that the elongate apertures 118 allow the user to easily locate tactilely the adhesive 118' by running the fingers laterally along the flaps 112' and 114' when the bag top is drawn over said flaps, and thereby to engage the bag top 120 against said adhesive by simply pressing inwardly.

Figure 6:
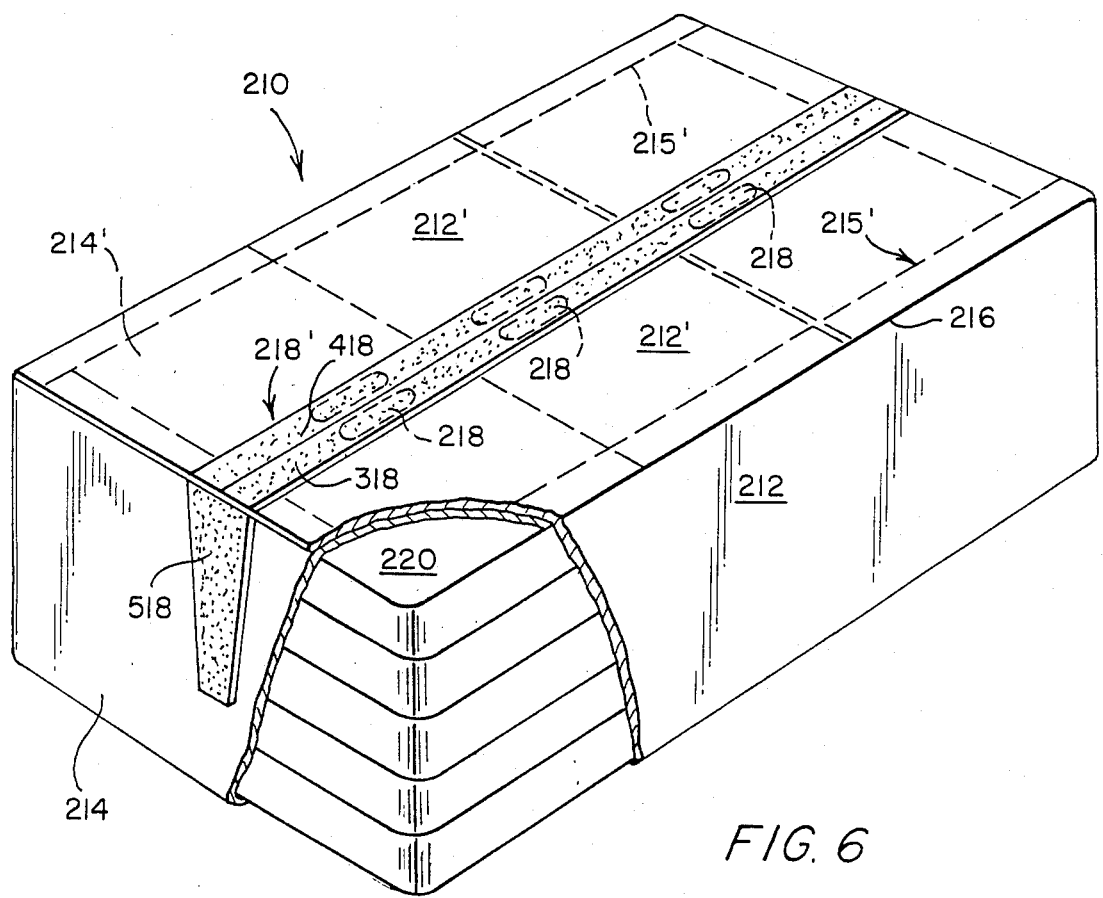
FIG. 6 is a further embodiment of the invention depicted in FIG. 1, a partial perspective view in which the closed box is shown partially in section.

FIG. 6 depicts yet another alternate embodiment of the invention. In this partial perspective view, litter box 210 is depicted in its closed, shipping and storage mode. Unlike the view of the invention in FIG. 1, wherein the adhesive means 18 was disclosed on the periphery of box as a continuous swatch on side walls 12, 12 and end walls 14, 14, the adhesive is now depicted generally as 218', comprising top portions 318 and 418, and two side portions 518 (a substantially identical side portion on the opposed end wall 214 is not shown). The flaps 212' and 214' are each provided with longitudinal serrations 216' at the connecting end thereof, thus providing with the 216 upstanding elongations to vertically extend the side and end walls of the box, upon opening thereof in the utility mode. Flaps 212' each have three apertures 218 disposed therein (although more or less are also within the scope of this invention). End flap 214' also has a single, centered, elongated aperture (not shown). In FIG. 6, the adhesive 218' can generally be applied as a single strip of double-sided tape, with a backing or cover strip (not shown). Portion 518 has a tapered or triangular configuration, although another configuration is suitable. Portions 318 and 418 are shown as separate components although, in fact, they could be applied in a single application with a tape gun with the tape being (but not the backing) medially slit. In this embodiment, adhesive means 218' and its backing can be used to seal the box during shipment and storage, as well as to hold down the flaps and liner during the use mode. The apertures 218, are deployed on the distal portions of flaps 212' directly below the adhesive 218'. When flaps 212', are pressed against side walls 212 in the use mode, the adhesive 218' is available for use directly behind apertures 218. Also, although not shown, a single, centered aperture is cut out of the distal end of flap 214', such that the side portion of liner 220 can attach through said aperture onto adhesive means 518 (the same deployment occurs with the opposite side, not shown). Also, in order to help in putting the litter containment box into use, the unshown backing or cover strip can have a free or unadhered portion in the form of a tab at the lower portion of adhesive means 518 which would enable the user to pull or remove such cover strip easily.

Whereas it may not be apparent from reference to the drawings, the comminutes or absorbent granules 22 comprise heavy, porous sand-like grains such as are commonly used for cat litter. Other litter materials such as comminuted clay, fossilized plant, and the like are suitable for use, with materials having good absorbency and low dusting properties being most preferred for use. In addition to their normal function of waste containment, they serve to anchor the bags against displacement in the carton, especially when exposed and the free and open end of the uppermost bag is drawn taut, folded over the flaps and held down against the flaps by the adhesive 18'. The adhesive material, as previously discussed is preferably double-sided tape. This can be selected from materials known to those skilled in the art, e.g., pressure-sensitive adhesives applied to films or other appropriate thin, paper or fabric substrates. (See, Handbook of Pressure-Sensitive Adhesives (Ed. D. Satas) (Van Nostrand, New York, 1982), esp. pp. 11-12 thereof, the disclosure of which is incorporated in its entirety by reference herein.) As previously discussed, the adhesive is covered with a removable backing or protective tape, which is releasable from the adhesive, for storage and shipping purposes. Also the container carton may consist of any suitable disposable substance such as fiberboard, wood, rigid plastic, etc. and the bag so long as it is fluid impermeable may comprise variant flexible materials which are sufficiently cohesive to support the load of litter and absorbed waste. Various other means of temporarily securing the folded flaps to the carton container box and the exposed bag to the flap may be employed without departing from the invention as shown and described; reference FIGS. 3 and 4.

We claim:

1. A disposable bag dispensing container for animal litter and waste comprising in combination:
   (A) disposable, substantially rigid carton having top, bottom and at least one intermediate side and at least one compressible flap in extension of said top and side, said flap being depressibly disposed with respect to the side;
   (B) adhesive means on the said side of the carton whereby to secure the flap and a flexible bag relative to the side;
   (C) plural, flexible bags each in superposed array with respect to the other, said bags each containing a measure of comminute litter absorbent substance in at least sufficient quantity to cover an area equivalent to a horizontal cross-section of the carton; the free end of each said bag being openable and successively engageable and disengageable with the flaps and the side of the carton.

2. The container of claim 1 wherein the compressible flap defines a foldable extension adjacent its connection with the side of the carton, whereby upon extension and folding of the flap outwardly, the flap attaches to the intermediate side and defines an extended perimeter to the side to make the first layer of comminute litter when exposed for use, recessed downwardly from the carton side to prevent spillage during use as the bag overlies the extension and side of the carton.

3. The container of claim 2 wherein the carton is of rectangular horizontal cross-section having four sides and corresponding flaps, each said flap defining cut-outs adjacent its free end to facilitate securing the flaps and exposed bag and subsequent removal of a used bag and contents from the carton.

4. The container of claim 3 comprising plural connected sides and corresponding flaps in extension thereof, each flap defining cut-out apertures through which the bags may engage the adhesive means for facile fastening and removal of the bags from the side of the carton.

5. The container of claim 4 wherein placement of adhesive behind the cut-out apertures allow bag top placement and adjustment without premature attachment of the bag thereto.

6. The container of claim 3 wherein said cut-out apertures are laterally elongated.

7. The container of claim 1 said adhesive means is located on said flap.

* * * * *